(12) United States Patent
Pan et al.

(10) Patent No.: US 10,401,709 B2
(45) Date of Patent: Sep. 3, 2019

(54) WEIGHT COMPONENT, A WEIGHT MECHANISM HAVING THE WEIGHT COMPONENT, AND A GIMBAL

(71) Applicant: SZ DJI OSMO TECHNOLOGY CO., LTD., Shenzhen (CN)

(72) Inventors: Paul Pan, Shenzhen (CN); Yanchong Zhao, Shenzhen (CN)

(73) Assignee: SZ DJI OSMO TECHNOLOGY CO., LTD., Shenzhen (CN)

(*) Notice: Subject to any disclaimer, the term of this patent is extended or adjusted under 35 U.S.C. 154(b) by 60 days.

(21) Appl. No.: 15/397,275

(22) Filed: Jan. 3, 2017

(65) Prior Publication Data
US 2017/0115551 A1 Apr. 27, 2017

Related U.S. Application Data

(63) Continuation of application No. PCT/CN2014/081673, filed on Jul. 4, 2014.

(51) Int. Cl.
| | |
|---|---|
| G03B 17/56 | (2006.01) |
| F16F 15/28 | (2006.01) |
| F16M 11/04 | (2006.01) |
| G02B 7/00 | (2006.01) |

(52) U.S. Cl.
CPC ............ *G03B 17/561* (2013.01); *F16F 15/28* (2013.01); *F16M 11/04* (2013.01); *G02B 7/001* (2013.01); *G03B 17/563* (2013.01)

(58) Field of Classification Search
CPC .... F16M 13/00; F16M 13/022; F16M 13/566; F16M 13/563; F16M 11/04; G03B 17/561; G03B 17/56; G02B 7/001; G02B 17/563; F16F 15/28

USPC ................. 248/187.1, 181.1, 276.1
See application file for complete search history.

(56) References Cited

U.S. PATENT DOCUMENTS

| | | | | |
|---|---|---|---|---|
| 5,742,859 A * | 4/1998 | Acker | ..................... | F16M 13/04 |
| | | | | 348/E5.025 |
| 6,685,148 B2 * | 2/2004 | Zadok | .................. | B65D 83/525 |
| | | | | 248/177.1 |
| 7,128,479 B2 * | 10/2006 | Chapman | ................ | B60R 11/04 |
| | | | | 396/428 |
| 7,252,441 B2 * | 8/2007 | Chapman | ................ | B60R 11/04 |
| | | | | 212/198 |

(Continued)

FOREIGN PATENT DOCUMENTS

| | | |
|---|---|---|
| CN | 1725096 A | 1/2006 |
| CN | 201707537 U | 1/2011 |

(Continued)

OTHER PUBLICATIONS

The World Intellectual Property Organization (WIPO) International Search Report for PCT/CN2014/081673 dated Mar. 27, 2015 p. 1-8.

*Primary Examiner* — Nkeisha Smith
(74) *Attorney, Agent, or Firm* — Anova Law Group, PLLC

(57) ABSTRACT

A weight component comprises a connecting seat including a fixing portion, a weight block, a guiding member disposed on the fixing portion, and a connecting member disposed on the weight block. The weight block is coupled to the guiding member through the connecting member and is movable along the guiding member to adjust a center of gravity of the weight component.

15 Claims, 7 Drawing Sheets

(56) References Cited

U.S. PATENT DOCUMENTS

| | | | |
|---|---|---|---|
| 8,033,742 B1* | 10/2011 | Chapman | B66F 11/048 |
| | | | 352/243 |
| 8,267,361 B1 | 9/2012 | Dordick | |
| 8,328,439 B2* | 12/2012 | Chapman | B66C 13/066 |
| | | | 318/87 |
| 9,360,740 B2* | 6/2016 | Wagner | F16M 11/18 |
| 9,507,244 B2* | 11/2016 | Chapman | G03B 17/561 |
| 9,534,730 B2* | 1/2017 | Black | F16M 11/10 |
| 9,885,942 B2* | 2/2018 | Zhao | G03B 17/561 |
| 9,900,511 B2* | 2/2018 | Bell | H04N 5/2328 |
| 2010/0254696 A1* | 10/2010 | McKay | F16M 13/04 |
| | | | 396/420 |
| 2011/0221900 A1 | 9/2011 | Reich | |
| 2014/0099092 A1* | 4/2014 | Di Leo | G03B 17/563 |
| | | | 396/420 |
| 2014/0270743 A1* | 9/2014 | Webb | H04N 5/2328 |
| | | | 396/55 |
| 2016/0016674 A1* | 1/2016 | Zhao | B64D 47/08 |
| | | | 244/118.1 |
| 2016/0305602 A1* | 10/2016 | Carthey | F16M 11/046 |
| 2016/0334057 A1* | 11/2016 | Koch | F16B 47/006 |
| 2017/0131622 A1* | 5/2017 | Zhao | G03B 17/561 |
| 2017/0153532 A1* | 6/2017 | Le | G03B 17/561 |
| 2017/0159875 A1* | 6/2017 | Wagner | F16M 13/04 |
| 2017/0205688 A1* | 7/2017 | Chapman | G03B 17/561 |
| 2017/0227834 A1* | 8/2017 | Zhao | G03B 17/561 |
| 2018/0004064 A1* | 1/2018 | Kim | G03B 5/00 |
| 2018/0017849 A1* | 1/2018 | Wood | G03B 17/561 |

FOREIGN PATENT DOCUMENTS

| | | |
|---|---|---|
| CN | 201953307 U | 8/2011 |
| CN | 202992585 U | 6/2013 |
| CN | 203147191 U | 8/2013 |
| CN | 203258324 U | 10/2013 |
| CN | 203376551 U | 1/2014 |
| CN | 203465508 U | 3/2014 |
| CN | 203673207 U | 6/2014 |
| CN | 204004178 U | 12/2014 |
| DE | 20217714 U1 | 2/2003 |
| DE | 20309440 U1 | 1/2004 |
| JP | 6167200 U | 5/1986 |
| JP | 62179498 U | 11/1987 |
| JP | 280745 U | 7/1990 |
| JP | 04039395 U | 4/1992 |
| JP | 2001092001 A | 4/2001 |
| JP | 2011160053 A | 8/2011 |
| JP | 3181673 U | 2/2013 |
| WO | 2014081998 A1 | 5/2014 |

* cited by examiner

WEIGHT COMPONENT, A WEIGHT MECHANISM HAVING THE WEIGHT COMPONENT, AND A GIMBAL

CROSS-REFERENCE TO RELATED APPLICATION

This is a continuation application of International Application No. PCT/CN2014/081673, filed on Jul. 4, 2014, the entire contents of which are incorporated herein by reference.

TECHNICAL FIELD

The present disclosure relates to a weight component, a weight mechanism having the weight component and a gimbal.

BACKGROUND

In image capturing with an electronic device, such as a video camera and a camera supported by an electronic gimbal, an electronic device having a telescope lens can be employed. A center of gravity of the electronic device may be unstable when a telescope lens having a heavy weight is provided to an electronic device having a light weight, such that the electronic device may move relative to the gimbal and an imaging quality may be adversely affected. In order to solve this problem, a support plate for installing the electronic device and a mounting plate coupled to the support plate are provided in existing gimbals, where the support plate being capable of moving relative to the mounting plate. A photographer can regulate the center of gravity of the electronic device by adjusting a position of the support plate relative to the mounting plate. However, in the above-described adjustable gimbal, the center of gravity of the electronic device be only be manually adjusted by the photographer, thus a position of the support plate relative to the mounting plate may not be precisely regulated. In case the electronic device is heavy and a weight distribution thereof is uneven, a limited adjustable range in relative position between the support plate and the mounting plate may prevent the electronic device from staying in a balanced state. A bias in the center of gravity of the gimbal and the electronic device may cause a torque between rotating axes of the gimbal and reduce a service life of the gimbal. In addition, the support plate carrying the electronic device may have a heavy weight, which may encumber in adjusting a position of the support plate relative to the mounting plate.

SUMMARY

In view of above-described prior problem, there is a need to provide a weight mechanism, a weight component and a gimbal having the weight mechanism which are convenient in adjusting a center of gravity.

An aspect of the present disclosure provides a weight component comprising a connecting seat including a fixing portion, a weight block, a guiding member disposed on the fixing portion, and a connecting member disposed on the weight block. The weight block is coupled to the guiding member through the connecting member and is movable along the guiding member to adjust a center of gravity of the weight component.

A further aspect of the present disclosure provides a weight mechanism comprising an installing member, a fastener disposed on the installing member, and a weight component. The weight component comprises a connecting seat connected with the installing member, a guiding member disposed on the connecting seat, a weight block coupled to the guiding member, and a connecting member disposed on the weight block. The weight block is connected to the guiding member through the connecting member and is movable along the guiding member to adjust a center of gravity of the weight component.

A further aspect of the present disclosure provides a gimbal comprising a support body, and a support plate coupled to the support body and coupled to the mounting rod, a mounting rod connected to the support body and coupled to the support plate, and a weight component adjustably disposed on the mounting rod. The weight component comprises a connecting seat connected with the support plate and including a fixing portion, a guiding member disposed on the fixing portion, a weight block coupled to the guiding member, and a connecting member disposed on the weight block. The weight block is coupled to the guiding member through the connecting member and is movable along the guiding member to adjust a center of gravity of the gimbal and the weight component.

In the gimbal in accordance with the present disclosure, the weight component comprises weight blocks which are adjustably disposed on the guiding members to balance the overall center of gravity of the gimbal. The process of adjusting the center of gravity is simplified and precise. In addition, the number of the weight blocks can be added or reduced according to actual requirements, and an adjustable stroke of the relative position of the weight blocks on the guiding members is larger; therefore, the center of gravity of the gimbal can be balanced by the weight mechanism when electronic devices having various weights are carried, such that the gimbal can be employed in a wide range of applications.

REFERENCE NUMBERS OF ELEMENTS

TABLE 1

Figure 1:
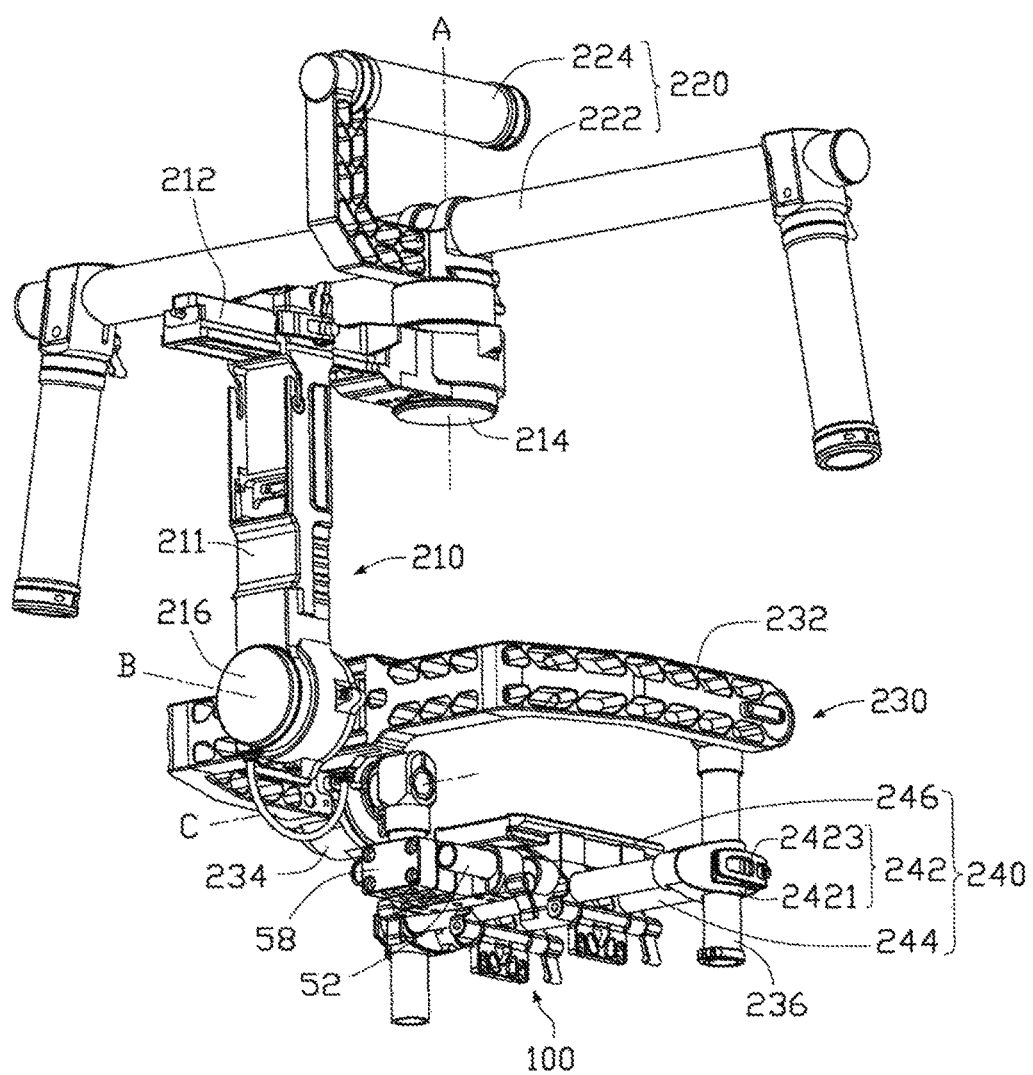
FIG. 1 is a perspective view of a gimbal, in accordance with some embodiments of the present disclosure.

| | |
|---|---|
| gimbal | 200 |
| support body | 210 |
| fixing member | 211 |
| translating member | 212 |
| first driving member | 214 |
| second driving member | 216 |
| first support component | 220 |
| connecting rod | 222 |
| handle | 224 |
| second support component | 230 |

TABLE 1-continued

| | |
|---|---|
| support frame | 232 |
| third driving member | 234 |
| support rod | 236 |
| third support component | 240 |
| adaptor | 242 |
| collar | 2421 |
| clip | 2423 |
| mounting rod | 244 |
| support plate | 246 |
| weight mechanism | 100 |
| fixing component | 10 |
| installing member | 12 |
| through hole | 121 |
| slot | 123 |
| fastener | 14 |
| clamping component | 30 |
| base | 32 |
| recess | 321 |
| movable member | 34 |
| clamping member | 36 |
| rotating portion | 361 |
| protrusion | 3611 |
| extension portion | 363 |
| weight component | 50 |
| connecting seat | 51 |
| connecting portion | 511 |
| fixing portion | 513 |
| guiding member | 52 |
| support member | 54 |
| body | 541 |
| mounting portion | 543 |
| mounting hole | 5431 |
| opening | 5433 |
| adjusting member | 56 |
| adjusting portion | 561 |
| abutting end | 5611 |
| operating portion | 563 |
| sleeving end | 5631 |
| operating end | 5633 |
| weight block | 58 |
| connecting member | 59 |
| electronic device | 300 |
| first axis | A |
| second axis | B |
| third axis | C |

The present disclosure will be described in the following embodiments in conjunction with the above-described drawings.

DETAILED DESCRIPTION

Referring to FIGS. 1 to 4, a gimbal 200 in accordance with an embodiment of the present disclosure can be used to support an electronic device 300 such as a video camera or a camera.

In some embodiments, the gimbal 200 can be a tri-axial gimbal. The gimbal 200 comprises a support body 210, a first support component 220 and a second support component 230 respectively disposed at two ends of the support body 210, a third support component 240 coupled to the second support component 230 and a weight mechanism 100 coupled to the third support component 240.

The support body 210 comprises a fixing member 211, a translating member 212, a first driving member 214 and a second driving member 216.

The fixing member 211 can be provided in a substantially cylinder shape. The translating member 212 is disposed substantially perpendicularly at an end of the fixing member 211 and capable of translating along a direction substantially perpendicularly to the fixing member 211.

The first driving member 214 is disposed at an end of the translating member 212. In some embodiments, the first driving member 214 is a brushless motor. A rotating axis of the first driving member 214 is a first axis A which is perpendicular to the translating member 212. The first driving member 214 is used to drive the translating member 212 to rotate about the first axis A, such that the fixing member 211 connected to the translating member 212, the second support component 230 pivotably connected to the fixing member 211, the third support component 240 pivotably connected to the second support component 230 and the weight mechanism 100 disposed on the third support component 240 can rotate about the first axis A.

The second driving member 216 is disposed at an end of the fixing member 211 distal from the translating member 212. In some embodiments, the second driving member 216 is a brushless motor. A rotating axis of the second driving member 216 is a second axis B perpendicular to the fixing member 211. The second driving member 216 is used to drive the second support component 230 to rotate about the second axis B, such that the third support component 240 pivotably connected to the second support component 230 and the weight mechanism 100 disposed on the third support component 240 can rotate about the second axis B.

The first support component 220 is connected to the first driving member 214. The first support component 220 comprises a connecting rod 222 and a handle 224. The connecting rod 222 is connected with the first driving member 214 at a substantial middle position thereof. The handle 224 is disposed on the connecting rod 222 to be held by the photographer.

The second support component 230 is connected to the second driving member 216. The second support component 230 comprises a support frame 232, a third driving member 234 disposed on the support frame 232 and a support rod 236 connected to the third driving member 234.

The support frame 232 is provided with a substantially "U" shape, and connected to the second driving member 216 at a substantial middle position thereof. The support frame 232 is substantially perpendicular to the fixing member 211, and capable of rotating about the second axis B under a driving of the second driving member 216.

The third driving member 234 is disposed at an end of the support frame 232 distal from the second driving member 216. In some embodiments, the third driving member 234 is a brushless motor. A rotating axis of the third driving member is a third axis C that is perpendicular to both the first axis A and the second axis B.

In some embodiments, the support rod 236 is provided as a substantially cylindrical rod. Two support rods 236 can be provided, and can be disposed at two ends of the support frame 232, respectively. An end of one of the two support rods 236 is connected to the third driving member 234, and capable of rotating about the third axis C under a driving of the third driving member 234. The other one of the two support rods 236 is rotatably disposed at an end of the support frame 232 distal from the third driving member 234. The two support rods 236 can be used to support the third support component 240.

The third support component 240 comprises two adaptors 242 which are respectively disposed on the two support rods 236, a mounting rod 244 connected between the two adaptors 242 and a support plate 246 connected with the mounting rod 244.

Each of the adaptors 242 comprises a collar 2421 and a clip 2423 disposed thereon. The collar 2421 may be movably sleeved on a corresponding support rod 236. The clip 2423 can apply a pressure onto the collar 2421, such that an aperture of the collar 2421 is reduced to clamp the support rod 236, thereby a position of the adaptor 242 relative to the corresponding support rod 236 can be adjusted.

In some embodiments, two mounting rods 244 are provided. The two mounting rods 244 can be juxtaposed and being parallel to each other. Two ends of each mounting rod 244 can be connected to the two adaptors 242, respectively. The support plate 246 is supported on the mounting rods 244 to support thereon the electronic device 300.

The weight mechanism 100 can be detachably disposed between the mourning rods 244 and the support plate 246. In some embodiments, the weight mechanism 100 is used to adjust the center of gravity among the second support component 230, the third support component 240 and the electronic device 300, such that the center of gravity of the second support component 230, the third support component 240, the electronic device 300 and the weight mechanism 100 as a whole falls on the rotating axis of the second driving member 216 (the second axis B).

Figure 5:
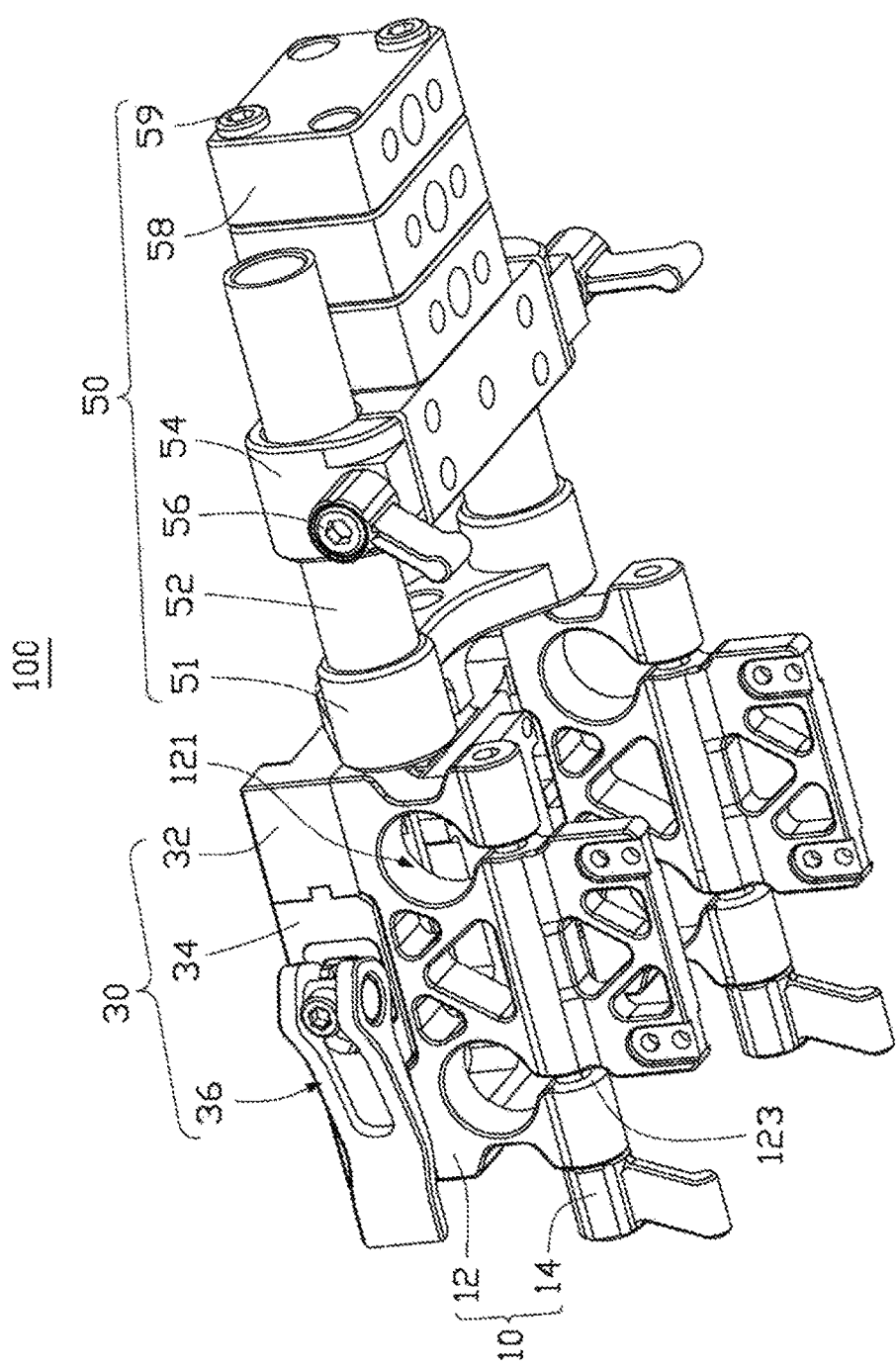
FIG. 5 is a perspective view of a weight mechanism of the gimbal of FIG. 1.

Referring to FIG. 5, the weight mechanism 100 comprises a fixing component 10, a clamping component 30 disposed on the fixing component 10 and a weight component 50 connected to the clamping component 30.

The fixing component 10 can be adjustably sleeved on the mounting rods 244. The fixing component 10 comprises an installing member 12 and a fastener 14 disposed on the installing member 12.

In some embodiments, two installing members 12 can be provided. Two ends of each installing member 12 can be respectively coupled to the two mounting rods 244. The two installing members 12 can be disposed substantially in parallel. The installing members 12 can be provided with through holes 121 in correspondence with the mounting rods 244. A side wall of the through holes 121 can be provided with a slot 123. The installing members 12 can be sleeved on the mounting rods 244 at the through holes 121. The slot 123 can be provided extending outwardly from inner wall of through hole 121 along a radial direction thereof and penetrating through a side of the installing member 12.

In some embodiments, the fastener 14 is a bolt. The fastener 14 can be provided to the installing member 12 in correspondence with the slot 123. One end of the fastener 14 can be inserted into the installing member 12 from a side thereof, passing through the slot 123, and threadedly connected to the other side of the installing member 12, such that the other end of the fastener 14 can be abutted against the installing member 12. The fastener 14 can be rotated relative to the installing member 12 to decrease a width of the slot 123, such that an aperture of the through holes 121 can be accordingly reduced and the installing member 12 can be firmly sleeved on the mounting rods 244. A position of the installing member 12 on the mounting rods 244 can be adjusted by releasing or tightening the fastener 14.

Figure 6:
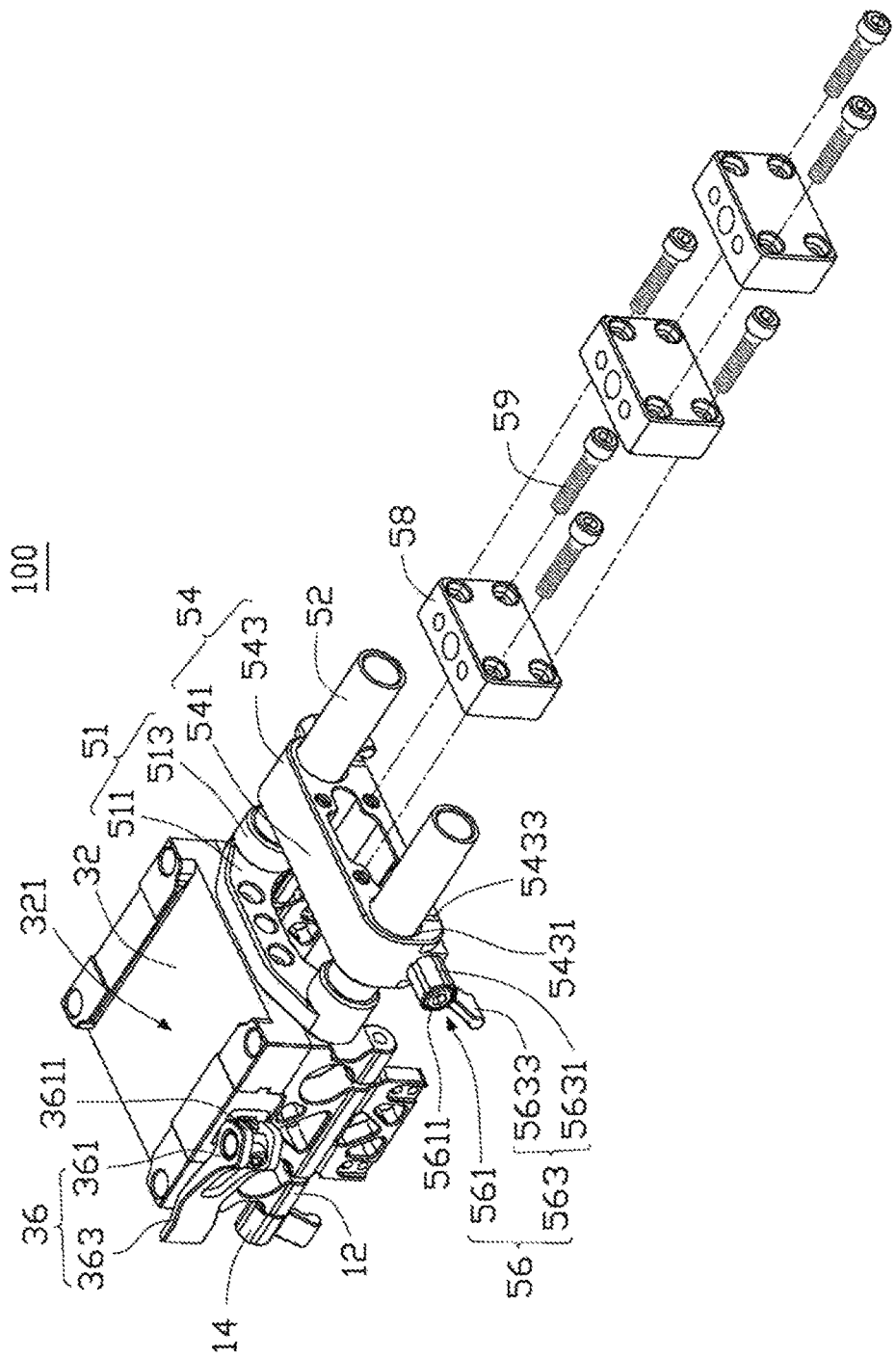
FIG. 6 is an exploded view of the weight mechanism of the gimbal of FIG. 5.

Referring to FIG. 6, the clamping component 30 comprises a base 32, a movable member 34 disposed on the base 32 and a clamping member 36 disposed adjacent to the movable member 34.

The base 32 can be fixedly disposed on the installing member 12 to carry thereon the support plate 246. A recess 321 can be provided on a side of the base 32 distal from the installing member 12. The recess 321 can be used to position and receive a portion of the support plate 246.

The movable member 34 can be provided elastically displaceable on one side of the recess 321. The movable member 34 can be pushed towards the other side of the recess 321 to clamp the support plate 246 in cooperation with a side wall of the recess 321.

The clamping member 36 can be rotatably connected to the base 32 and abut against the movable member 34. The clamping member 36 can comprise a rotating portion 361 rotatably connected with the base 32 and an extension portion 363 formed on the rotating portion 361. The rotating portion 361 can be provided as a substantially irregular cam with a protrusion 3611 formed thereon. When the extension portion 363 is driven by an external force to drive a rotation of the rotating portion 361, the protrusion 3611 may be capable of rotating and pushing against the movable member 34 to displace the movable member towards the other side of the recess 321.

Figure 7:
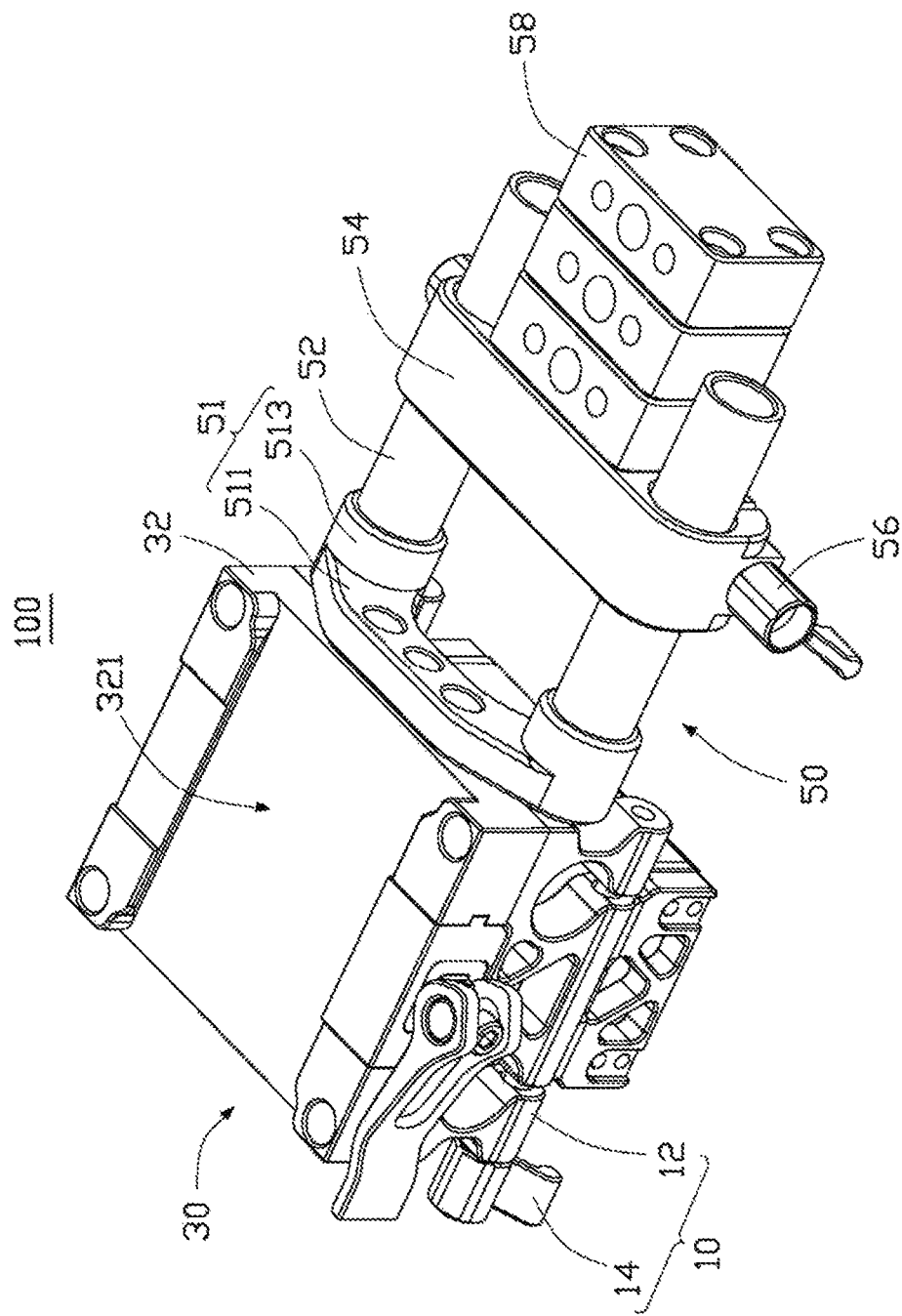
FIG. 7 is a perspective view of the weight mechanism of the gimbal of FIG. 5 in another angle of view.

Referring to FIG. 7, the weight component 50 is provided to an end of the base 32. The weight component 50 can comprise a connecting seat 51, a guiding member 52 disposed on the connecting seat 51, a support member 54 sleeved on the guiding member 52, and an adjusting member 56, a weight block 58 and a connecting member 59 disposed on the support member 54.

The connecting seat 51 can comprise a connecting portion 511 and a fixing portion 513 formed on the connecting portion. The connecting portion 511 can be coupled to the base 32 via a fastener such as a bolt. The fixing portion 513 can be provided as a hollow cylindrical rod. In some embodiments, two fixing portions 513 can be provided, protruding from two ends of the connecting portion 511 respectively. The fixing portions 513 can be used to fix the guiding member 52.

The guiding member 52 can be provided as a cylindrical rod which is substantially perpendicular to the connecting seat 51. The guiding member 52 can be used to guide a movement of the support member 54 and the weight block 58. In some embodiments, two guiding members 52 can be provided, each being fixed on one of the two fixing portions 513. one end of the guiding member 52 can be fixedly inserted into the fixing portion 513 to avoid a shaking of the guiding members 52 in guiding the movement of the support member 54 and the weight block 58.

The support members 54 can be movably sleeved on the guiding members 52. The support members 54 can comprise a body 541 and two mounting portions 543 which are formed respectively on two ends of the body 541. The body 541 can be provided in a substantially block shape. The two mounting portions 543 can be respectively formed at two opposite ends of the body 541 in correspondence with the two guiding members 52. Each one of the mounting portions 543 can be provided with a mounting hole 5431. An opening 5433 can be provided on a side wall of the mounting hole 5431. The mounting portions 543 can be sleeved on the guiding members 52 at the mounting holes 5431. The opening 5433 may be provided extending outwardly from an inner wall of the mounting hole 5431 along the radial direction thereof and penetrating through a side of the mounting portions 543.

In some embodiments, two adjusting members 56 can be provided, each being disposed on the mounting portions 543 in correspondence with the one of two guiding members 52. Each one of the adjusting members 56 can comprise an adjusting portion 561, which is installed on the mounting portion 543 in correspondence with the opening 5433, and an operating portion 563 which is disposed on the adjusting portion 561. The adjusting portion 561 can comprise an adjusting end (not shown) and an abutting end 5611 formed at an end of the adjusting end. In some embodiments, the adjusting portion 561 is a bolt, and the adjusting end is a threaded rod of the bolt. The adjusting end of the adjusting portion 561 can be inserted into the mounting portion 543 from a side thereof, passing through the opening 5433, and threadedly connected to the other side of the mounting portion 543, such that the abutting end 5611 of the adjusting portion 561 can be abutted against the mounting portion 543. In some embodiments, the abutting end 5611 is a hexagon socket head for a convenient detaching. The operating portion 563 can comprise a sleeving end 5631 which is sleeved on the abutting end 5611 and an operating end 5633 which is formed on the sleeving end 5631. The sleeving end 5631 can be firmly sleeved on the abutting end 5611, and capable of driving a rotation of the adjusting portion 561 by the abutting end 5611, such that the adjusting member 56 can be rotated relative to the mounting portion 543. A width of the opening 5433 can be decreased while the abutting end 5611 pushing against the mounting portion 543. An aperture of the mounting bole 5431 can thus be reduced to firmly sleeve the support member 54 on the guiding member 52.

In some embodiments, three weight blocks 58 are provided, and the connecting member 59 is a bolt. The three weight blocks 58 may be stacked and fixed onto the body 541 of the support member 54 via the connecting member 59. The weight blocks 58 can be capable of translating along the guiding members 52 together with the support members 54, such that the center of gravity of the electronic device 300 can be adjusted in accordance with various attitudes of the electronic device 300. It is appreciated that the number of the weight blocks 58 may be one or more. In addition, the weight blocks 58 can have the same weight or different weight.

Figure 2:
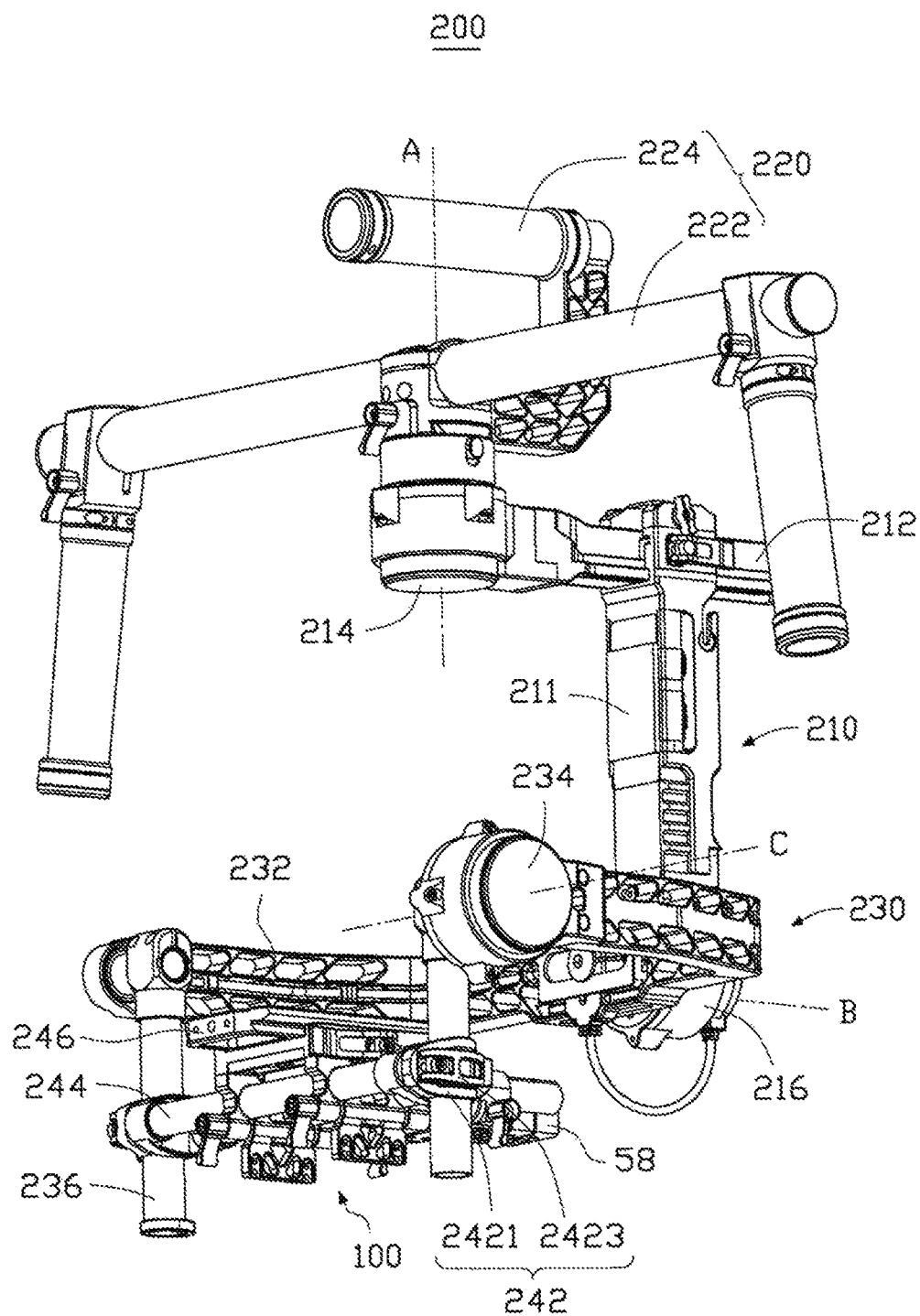
FIG. 2 is a perspective view of the gimbal of FIG. 1 in another angle of view.

Referring to FIGS. 1 and 2, in assembling the gimbal 200 in accordance with some embodiments of the present disclosure, first, the first support component 220 is coupled to the support body 210 through the first driving member 214, the second support component 230 is coupled to the support body 210 via the second driving member 216, and the mounting rod 244 ma is coupled to the support rod 236. Secondly, the fixing member 10 is installed on the mounting rod 244, the clamping component 30 is installed on the fixing component 10, and the support plate 246 is installed and fixed on the base 32 of the clamping component 30. Next, the connecting seat 51 of the weight component 50 is installed on the base 32, the guiding member 52 is disposed on the weight component 50, and the support member 54 is installed on the guiding member 52 through the adjusting member 56. Finally, the weight block 58 is disposed on the support member 54 through the connecting member 59.

Figure 3:
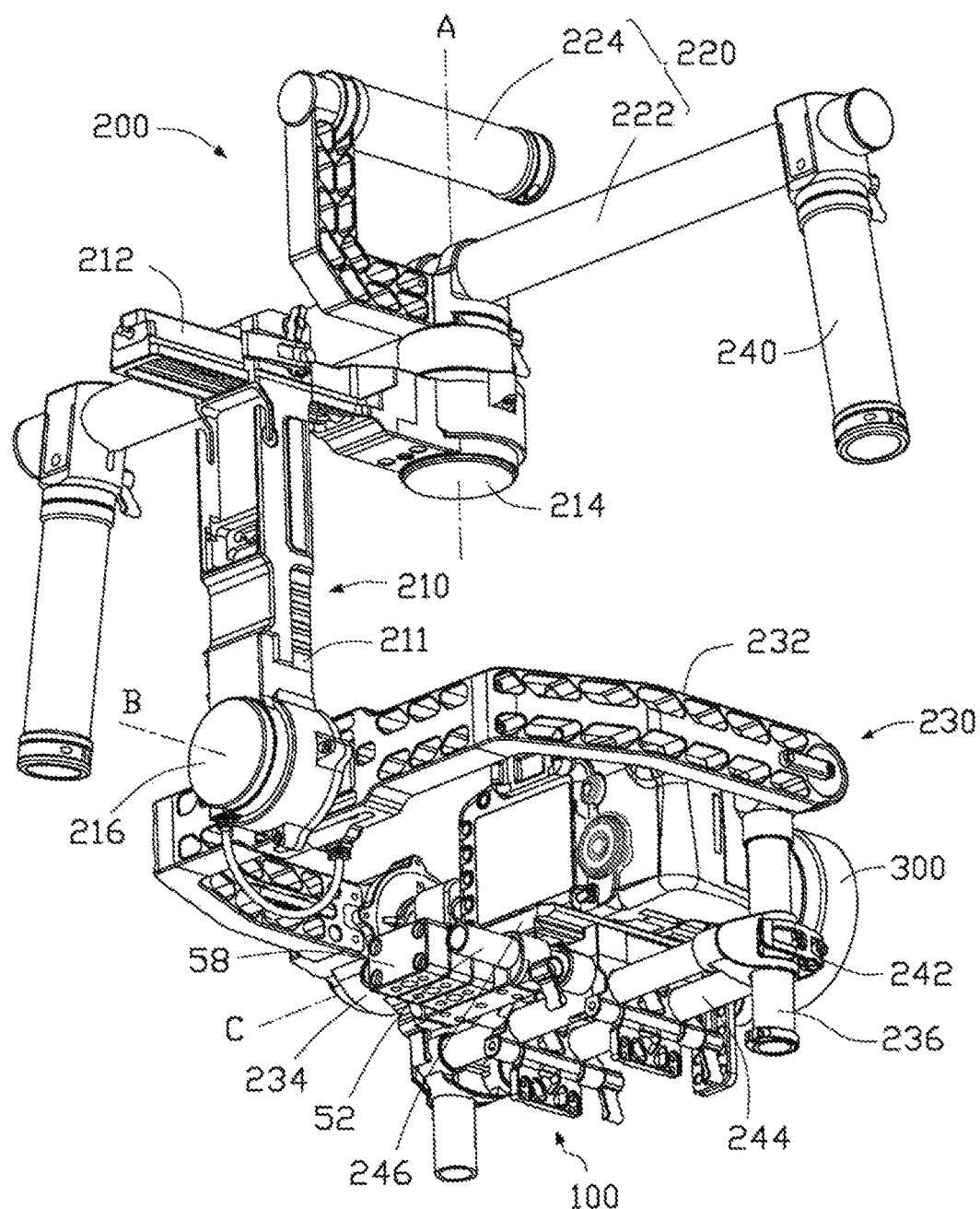
FIG. 3 is a perspective view of the gimbal of FIG. 1 in an operational state.
Figure 4:
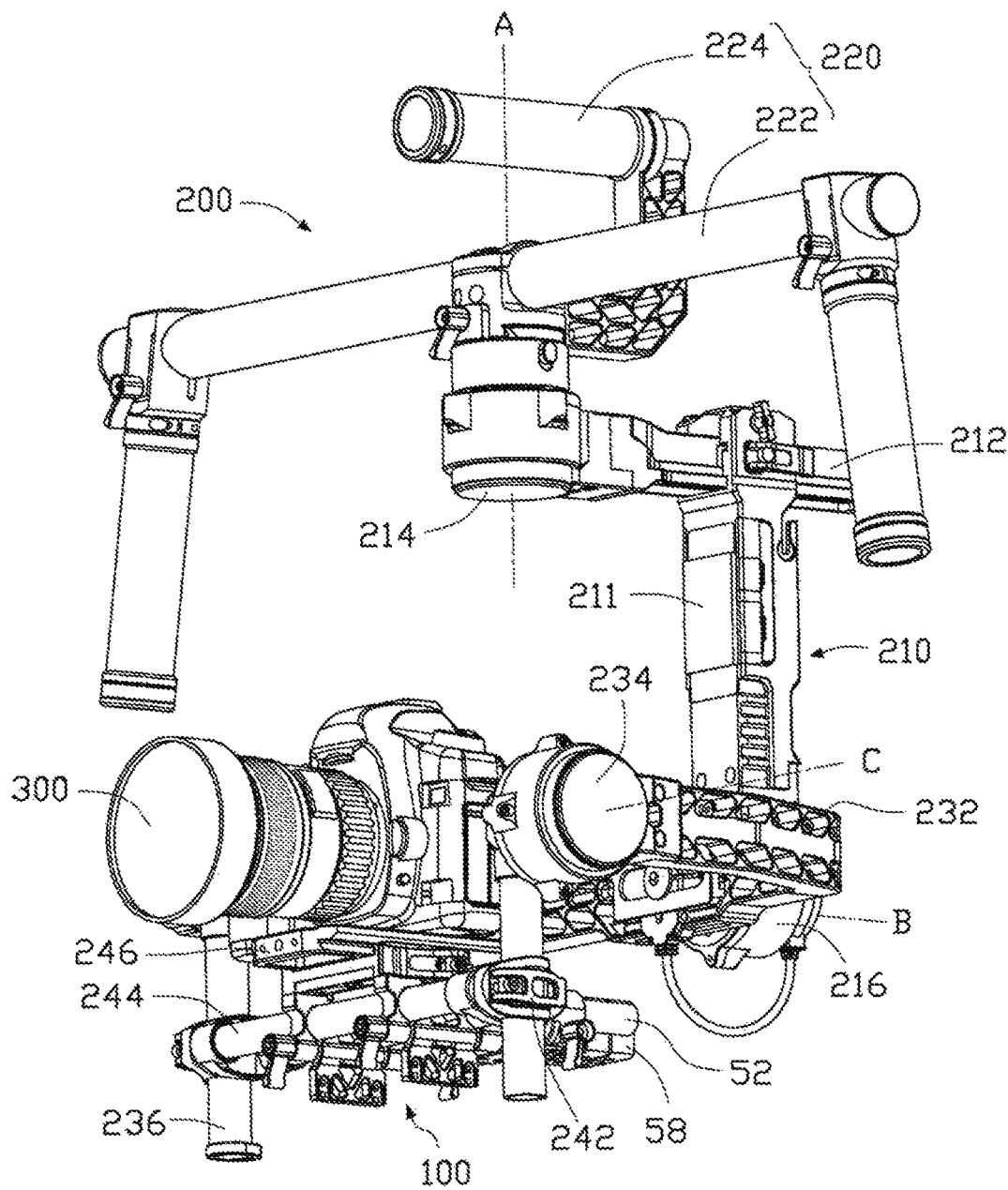
FIG. 4 is a perspective view of the gimbal of FIG. 3 in another angle of view, showing an operational state thereof.

Referring to FIG. 3 and FIG. 4, in operating the weight mechanism 100 of the gimbal 200 in accordance with some embodiments of the present disclosure, first, the electronic device 300 is disposed on the support plate 246. Then, a gravity distribution of the gimbal 200 having the electronic device 300 is observed. A position of the weight mechanism 100 is adjusted according to the gravity distribution, a number of the weight blocks 58 is accordingly added or reduced, and a position of the support member 54 and the weight blocks 58 on the guiding member 52 is adjusted. If the center of gravity of the gimbal 200 and the electronic device 300 is biased to a side of the second axis B, then a position of the weight mechanism 100 on the mounting rods 244 is adjusted by releasing the fastener 14 and moving the installing member 12, until the line of gravity of the gimbal 200 and the electronic device 300 is coplanar with the second axis B, that is, the center of gravity of the gimbal 200 and the electronic device 300 substantially falls on the second axis B. Then, the fastener 14 is tightened to fix the weight mechanism 100 on the mounting rods 244. If the center of gravity of the gimbal 200 and the electronic device 300 after above adjustment is biased towards a lens side of the electronic device 300 with a significant offset and thus the gimbal 200 inclines towards the lens side of the electronic device 300, then the support member 54 and the weight blocks 58 are moved away from the connecting seat 51 along the guiding member 52 by releasing the adjusting member 56, enlarging the aperture of the mounting hole 5431, and applying an external force onto the support member 54. Therefore, the overall center of gravity of the gimbal 200 is moved to a body side of the electronic device 300 until the overall center of gravity of the gimbal 200 is balanced. Then, the fastener 56 is tightened to fix the support member 54 on the guiding member 52. If the center of gravity of the gimbal 200 is biased towards a side of the weight blocks 58 with significant offset, then a reverse adjusting is performed. For instance, the support member 54 and the weight blocks 58 are moved towards the connecting seat 51 by releasing the adjusting member 56, until the center of overall gravity of the gimbal 200 is balanced. Then, the adjusting member 56 is tightened to fix the support member 54 on the guiding member 52.

In the gimbal 200 in accordance with embodiments of the present disclosure, the weight mechanism 100 comprises weight blocks 52 which are adjustably disposed on the guiding members 52 to balance the overall center of gravity of the gimbal 200 and the electronic device 300. The process of adjusting the center of gravity is simplified and precise by a mating between the guiding members 52 and the mounting holes 5431. The overall center of gravity of the gimbal 200 and the electronic device 300 is adjusted to fall on the second axis B by adjusting a relative position of the installing members 12 on mounting rods 244 and a relative position of the weight blocks 58 on the guiding members 52. The gimbal 200 is prevented from any damage of a torque generated by an offset in the center of gravity. In other words, the support frame 232 may not shake back and forth due to the torque, thus improving a stability of the electronic device 300 during rotating. In addition, the number of the weight blocks 58 can be added or reduced according to actual requirements, and an adjustable stroke of the relative position of the weight blocks 58 on the guiding members 52 is large; therefore, the center of gravity of the gimbal 200 can be balanced by the weight mechanism 100 when electronic devices 300 having various weights are carried, such that the gimbal 200 can be employed in a wide range of applications.

It will be obvious to those skilled in the art that, one or more mounting rods 244 can be provided, and one or more through holes 121, slot 123 and fasteners 14 can be provided, providing that the fixing member 10 can be firmly installed on the support plate 246.

It will be obvious to those skilled in the art that, in some instances, the fixing component 10 and the clamping component 30 can be omitted from the configuration of the gimbal 200. The support plate 246 can be installed on the mounting rod 244, and the connecting seat 51 of the weight component 50 can be firmly connected with the support plate 246, providing that the position of the support plate 246 relative to the mounting rod 244 can be adjusted, such that the weight component 50 can adjust the center of gravity of the gimbal 200 along the axial direction of the mounting rod 244 to fall the center of gravity on the second axis B.

It will be obvious to those skilled in the art that, the guiding member 52 can be provided in a shape other than a cylindrical rod. For instance, the guiding member 52 can be provided as a strip-shaped rod or a rectangular rod, providing that the support member 54 can be movably sleeved on the guiding member 52 and can be fastened on the guiding member 52 through the adjusting member 56. In some instances, the guiding member 52 can be provided as a rail or a guiding groove, and the support member 54 can be movably disposed on the rail or the guiding groove of the guiding member 52 and fastened on the guiding member 52 through the adjusting member 56.

It will be obvious to those skilled in the art that, the adjusting member 56 can be omitted from the configuration of the weight mechanism 100. In some instances, the support member 54 can be coupled to the guiding member 52 through a mating between a plurality of hooks and slots, and a relative position of the support member 54 over the guiding member 52 can be adjusted, providing that the support member 54 can move the weight blocks 58 along the guiding member 52, and the support member 54 can be firmly positioned on the guiding member 52 to adjust the center of gravity of the weight mechanism 100.

It will be obvious to those skilled in the art that, the support member 54 can be omitted from the configuration of the weight mechanism 100. In some instances, the weight blocks 58 can be movably disposed on the guiding member 52, providing that the weight blocks 58 can be moved along the guiding member 52 and can firmly positioned on the guiding member 52 through the connecting member 59 to adjust the center of gravity of the weight mechanism 100.

Numerous variations, changes, and substitutions will now occur to those skilled in the art without departing from the disclosure. It is intended that any change made without departing from the disclosure is covered in the scope of the disclosure.

What is claimed is:

1. A weight component, comprising:
   a connecting seat including a fixing portion;
   a weight block;
   a guiding member coupled to the fixing portion;
   a connecting member disposed on the weight block;
   a support member movably sleeved on the guiding member and including a mounting hole in correspondence with the guiding member, an opening being provided on a side wall of the mounting hole;
   an adjusting member inserted in the support member and connecting two sides of the opening, the adjusting member being movable relative to the support member to change an aperture of the mounting hole; and
   an operating portion disposed on the adjusting member, the operating portion comprising a sleeving end connected on the adjusting member and an operating end formed on the sleeving end;
   wherein:
   the weight block is coupled to the guiding member through the connecting member and the support member and is movable along the guiding member to adjust a center of gravity of the weight component, and
   the guiding member penetrates the mounting hole of the support member.

2. The weight component of claim 1, wherein:
   the opening penetrates through the support member from the side wall of the mounting hole, and
   the adjusting member comprises an adjusting end and an abutting end formed on the adjusting end, the adjusting end being inserted into the support member from a side of the support member, passing through the opening and inserted into an other side of the support member, such that the abutting end abuts against the support member.

3. The weight component of claim 1, wherein the connecting seat further comprises a connecting portion connected on a base, the fixing portion is provided protruding from the connecting portion, and an end of the guiding member is inserted in the fixing portion.

4. A weight mechanism comprising:
   an installing member;
   a base disposed on the installing member and having a recess;
   a support plate positioned within the recess;
   a fastener disposed on the installing member; and
   a weight component, comprising:
      a connecting seat connected with the installing member and installed on the base;
      a guiding member coupled to the connecting seat;
      a weight block coupled to the guiding member;
      a connecting member disposed on the weight block; and
      a support member movably sleeved on the guiding member and including a mounting hole in correspondence with the guiding member,
      wherein:
         the weight block is connected to the guiding member through the connecting member and the support member and is movable along the guiding member to adjust a center of gravity of the weight component, and
         the guiding member penetrates the mounting hole of the support member.

5. The weight mechanism of claim 4, further comprising:
   a movable member displaceably provided on one side of the recess; and
   a clamping member disposed on and rotatably connected to the base and being adjacent to the movable member, the clamping member being configured to rotate to push against the movable member to displace the movable member towards an other side of the recess.

6. The weight mechanism of claim 5, wherein the clamping member comprises a rotating portion rotatably connected with the base and an extension portion formed on the rotating portion, a contour of the rotating portion being in a shape of a cam, the extension portion being configured to drive the rotating portion to rotate, such that the rotating portion pushes against the movable member to displace the movable member towards the other side of the recess.

7. A gimbal comprising:
   a support body;
   a mounting rod connected to a support body and coupled to the support plate;
   a support frame rotatably disposed on the support body;
   a support rod rotatably disposed on the support frame;
   an installing member sleeved on the mounting rod;
   the support plate coupled to the support body and supported on the installing member; and
   a weight component adjustably disposed on the mounting rod, the weight component comprising:
      a connecting seat connected with the support plate and including a fixing portion;
      a guiding member coupled to the fixing portion;
      a weight block coupled to the guiding member;
      a connecting member disposed on the weight block; and
      a support member movably sleeved on the guiding member and including a mounting hole in correspondence with the guiding member,
      wherein:

the weight block is coupled to the guiding member through the connecting member and the support member and is movable along the guiding member to adjust a center of gravity of the gimbal and the weight component, and the guiding member penetrates the mounting hole of the support member.

8. The gimbal of claim 7, further comprising:

an adaptor disposed on the support rod and comprising a collar adjustably sleeved on the support rod and a clip disposed on the collar, wherein the mounting rod is installed on the collar.

9. The gimbal of claim 7, further comprising:

a fastener inserted in the installing member, wherein:

the installing member includes a through hole in correspondence with the mounting rod and having a slot on a side wall of the through hole, the mounting rod is inserted in the through hole, and the fastener connects two sides of the slot, the fastener being configured to move relative to the installing member to change an aperture of the through hole.

10. The gimbal of claim 7, further comprising:

a base installed on the installing member and having a recess, wherein the support plate is located within the recess and the connecting seat is installed on the base.

11. The gimbal of claim 10, further comprising:

a movable member displaceable provided on one side of the recess; and a clamping member disposed on and rotatably connected to the base and being adjacent to the movable member, the clamping member being configured to rotate to push against the movable member to displace the movable member towards an other side of the recess.

12. The gimbal of claim 11, wherein the clamping member comprises a rotating portion rotatably connected with the base and an extension portion formed on the rotating portion, a contour of the rotating portion being in a shape of a cam, the extension portion being configured to drive the rotating portion to rotate, such that the rotating portion pushes against the movable member to displace the movable member towards the other side of the recess.

13. The gimbal of claim 7, further comprising:

a connecting rod rotatably connected with the support body; and a handle disposed on the connecting rod.

14. The gimbal of claim 13, wherein:

the support body comprises a fixing member, a translating member movably disposed on an end of the fixing member, and a first driving member disposed on the translating member, the connecting rod is connected with the first driving member, and the first driving member is configured to drive the translating member and the fixing member to rotate relative to the connecting rod about a first axis.

15. The gimbal of claim 14, wherein:

the support body further comprises a second driving member disposed on the fixing member, the support frame is connected with the second driving member, and the second driving member is configured to drive the support frame to rotate about a second axis perpendicular to the first axis.

* * * * *